(12) United States Patent
Faulkner et al.

(10) Patent No.: US 10,919,201 B2
(45) Date of Patent: Feb. 16, 2021

(54) BLIND INSTALLATION OF INJECTION MOLD COMPONENTS

(71) Applicant: F&S Tool, Inc., Erie, PA (US)

(72) Inventors: James D. Faulkner, Erie, PA (US); Casey Jones, Harborcreek, PA (US)

(73) Assignee: F&S Tool, Inc., Erie, PA (US)

( * ) Notice: Subject to any disclaimer, the term of this patent is extended or adjusted under 35 U.S.C. 154(b) by 155 days.

(21) Appl. No.: 16/088,794

(22) PCT Filed: Sep. 25, 2018

(86) PCT No.: PCT/US2018/052623
§ 371 (c)(1),
(2) Date: Sep. 26, 2018

(87) PCT Pub. No.: WO2019/067437
PCT Pub. Date: Apr. 4, 2019

(65) Prior Publication Data
US 2020/0061891 A1 Feb. 27, 2020

Related U.S. Application Data

(60) Provisional application No. 62/672,381, filed on May 16, 2018, provisional application No. 62/647,100, filed on Mar. 23, 2018, provisional application No. 62/565,998, filed on Sep. 29, 2017.

(51) Int. Cl.
*B29C 45/26* (2006.01)
*B29C 45/17* (2006.01)

(52) U.S. Cl.
CPC ...... *B29C 45/2602* (2013.01); *B29C 45/1756* (2013.01)

(58) Field of Classification Search
CPC .. B29C 45/2602; B29C 45/1756; B29C 45/17
See application file for complete search history.

(56) References Cited

U.S. PATENT DOCUMENTS 4,150,931 A 4/1979 Gabrys
4,174,939 A * 11/1979 Fenner ............... B29C 45/2602
425/451.9

(Continued)

OTHER PUBLICATIONS

International Search Report received in related International Application No. PCT/US2018/052623 dated Dec. 7, 2018.

(Continued)

*Primary Examiner* — John C Hong
(74) *Attorney, Agent, or Firm* — The Marbury Law Group, PLLC

(57) ABSTRACT

What is presented is a system for blind securing injection mold components to an injection molding machine. The system comprises a shuttle plate that has at least one locking mechanism mounted to it. Each locking mechanism has a larger installation area and a smaller lock area. Each injection mold component has a notch that has a corresponding geometry to the lock area such that the said injection mold component is configured to be inserted into the installation area and the shuttle plate is configured to move to seat the notch into the lock area and secure the injection mold component to the shuttle plate.

6 Claims, 8 Drawing Sheets

(56) References Cited

U.S. PATENT DOCUMENTS

| | | | |
|---|---|---|---|
| 4,472,128 A * | 9/1984 | Ruhl | B25B 5/10 |
| | | | 425/186 |
| 4,765,585 A | 8/1988 | Wieder | |
| 5,219,595 A * | 6/1993 | Caggiani | B29C 33/24 |
| | | | 425/450.1 |
| 6,431,852 B1 | 8/2002 | Vandenberg | |
| 8,480,391 B2 | 7/2013 | Lausenhammer et al. | |
| 2015/0028504 A1 * | 1/2015 | Frost | B29C 33/305 |
| | | | 264/39 |

OTHER PUBLICATIONS

Written Opinion of the International Searching Authority received in related International Application No. PCT/US2018/052623 dated Dec. 7, 2018
International Preliminary Report on Patentability received in related International Application No. PCT/US2018/052623 dated Mar. 31, 2020.

* cited by examiner

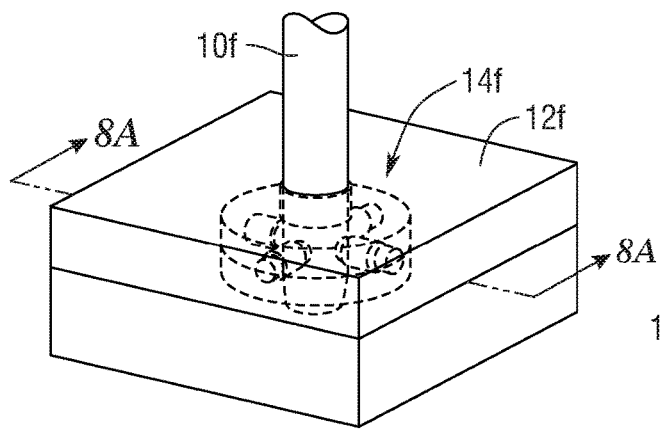 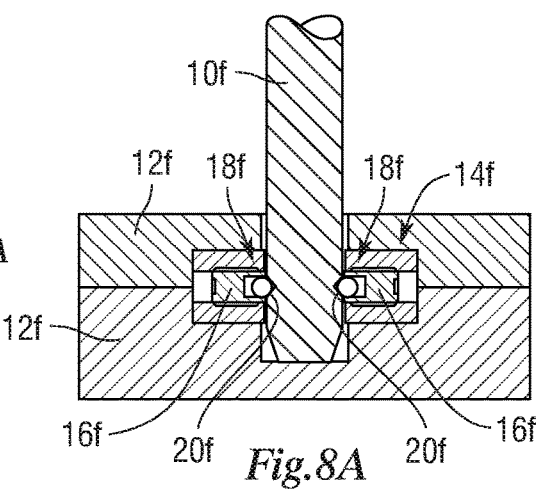
Fig.8  Fig.8A
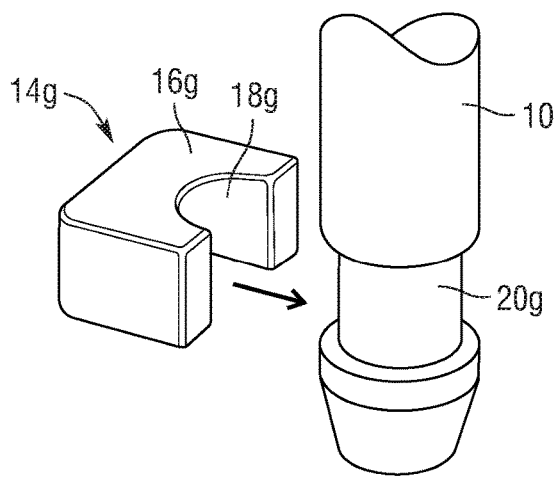 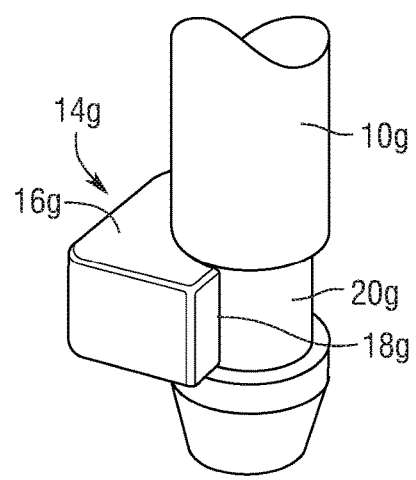
Fig.9  Fig.9A
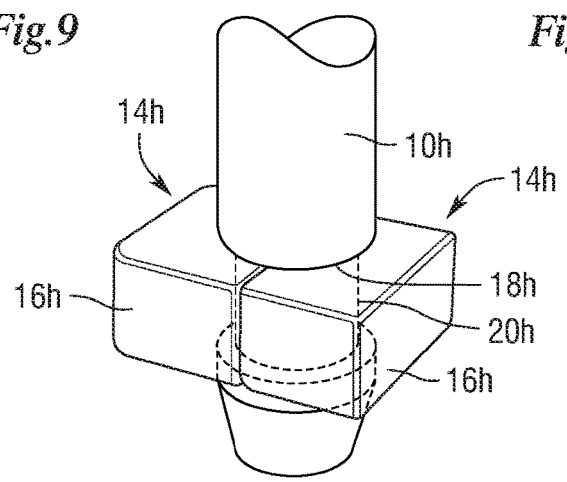
Fig.10

BLIND INSTALLATION OF INJECTION MOLD COMPONENTS

BACKGROUND

Injection molding is a manufacturing process for producing parts by injecting molten material into a mold. Injection molding machines comprise various components that work together to ultimately form a plastic part that is ejected from the mold. The basic parts of the mold are the cavity and ejector system. The plastic part may require pins, slides, sleeves, cores, and other injection mold components that may move to form details or assist with ejection of the finished parts. Additional injection mold components may need to be switched out or changed to form different versions of the parts. These could include varying orifices, diameters, lengths, widths, or other dimensions while utilizing most of the remainder of the mold. Changing or replacing any of the injection mold components in traditional injection mold machines is not an easy process and often requires tooling and labor that causes significant machine downtime and impacts production schedules. What is presented is an improved system and method for blind installation of injection mold components in an injection molding machine.

SUMMARY

What is presented is a system for blind securing injection mold components to an injection molding machine. The system comprises a shuttle plate that has at least one locking mechanism. Each locking mechanism has a larger installation area and a smaller lock area. Each injection mold component has a notch that has a corresponding geometry to the lock area such that the injection mold component is configured to be inserted into the installation area and the shuttle plate is configured to move to seat the notch into the lock area and secure the injection mold component to the shuttle plate.

In some embodiments, the system for blind installation of injection mold components of comprises two shuttle plates that operate in opposition to lock the injection mold component into the lock area. In various embodiments, that lock area has one of a semicircular edge, a square edge, and a hex edge. The injection mold component can be any injection molding component or device that may be needed to be installed, changed or replaced in an injection molding machine including knockout rods, pins, slides, sleeves, cores, cavities, strippers, ejector pins, or other change components.

In some embodiments of the system for blind installation of injection mold components, a retainer plate is used for mounting at least one locking component. The locking component comprising an installation portion and a lock portion. Each injection mold component has a notch that has a corresponding geometry to the lock portion. Each locking component is configured to move and seat the notch into the lock portion to secure the injection mold component to the locking component. In various embodiments of this system, two locking components located on opposing sides of the injection mold component are used to secure the injection mold component to the retaining plate. In some embodiments, the locking component is an aperture or may comprise a hinge or a C-clamp. The installation portion may be actuated mechanically, hydraulically, or pneumatically.

In another embodiment, the system for blind installation of injection mold components comprises a retainer plate comprising at least one locking mechanism that comprises an installation area and a lock area. The installation area is configured to receive an injection mold component and the lock area comprises at least one key slot that at least partially intersects the installation area. A key is insertable into each key slot. Each injection mold component has a notch that has a geometry configured such that the insertion of the key into the key slot intersects the installation area and the notch to lock the injection mold component into the retainer plate. In some embodiments, the installation area is partially intersected by two key slots. In other embodiments, the installation area is fully intersected by a key slot and the notch comprises a hole through the injection mold component.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

FIG. 8 shows an embodiment of the system for blind installation of injection mold components comprising a series of locking mechanisms that surround the notch of the injection mold component;

FIG. 8A is a cross-sectional view of the locking mechanism of FIG. 8;

FIG. 9 is a perspective view of an embodiment in which the locking mechanism is a C-clamp in the open position;

FIG. 9A is a perspective view of the locking mechanism of FIG. 9 in the locked position;

FIG. 10 is a perspective view of an embodiment in which the locking mechanism comprises two C-clamps in opposition in the locked position;

DETAILED DESCRIPTION

Figure 1:
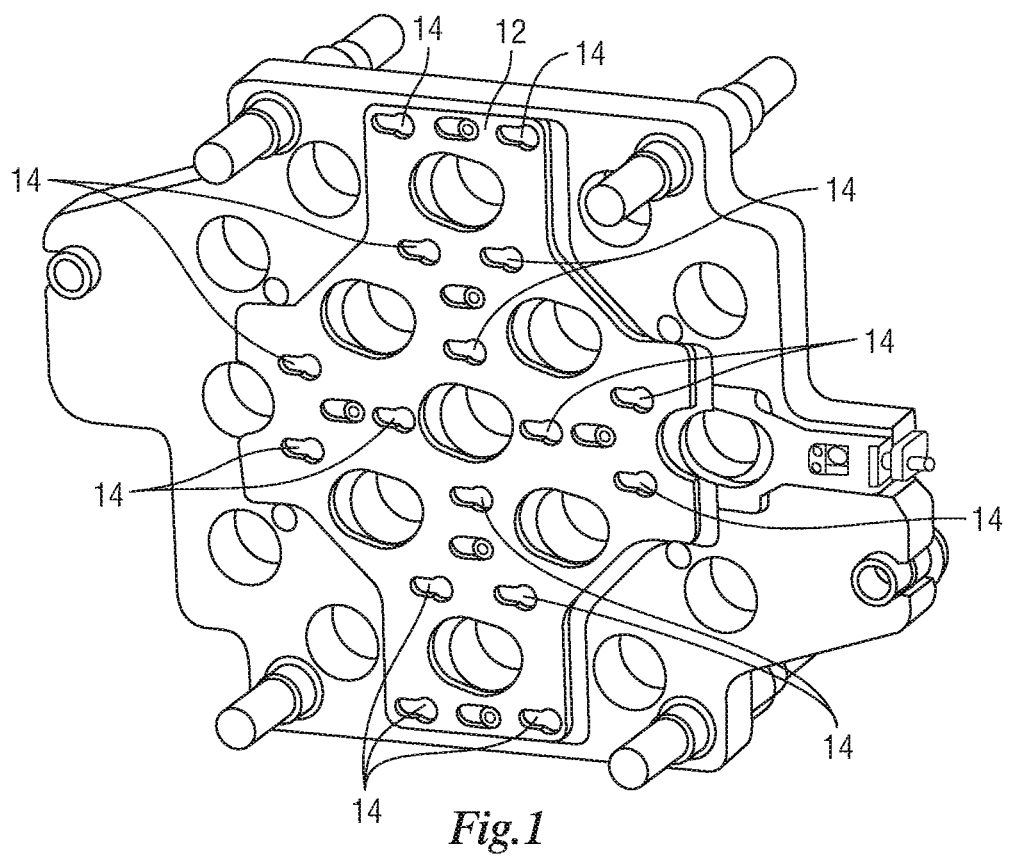
FIG. 1 shows a shuttle plate having a plurality of locking mechanisms with the shuttle plate in a position to receive an injection mold component.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Injection molding machines typically comprise molds that have channels from a source of molten plastic that lead to a cavity that is shaped into the form of the final molded part. Molten plastic is injected through these channels into the cavity to create the final molded part. The mold is typically of two parts that are split along a line of the final molded part that would allow for the separation of the part from the mold. The plastic part may require various injection mold components such as pins, slides, sleeves, cores, etc. that may move to form details or assist with the removal or ejection of the final part from the mold. Additional injection mold components may need to be changed out to form different versions of the parts that could include varying orifices, diameters, lengths, widths, or other dimensions while utilizing much of the remainder of the mold.

There are a variety of types of injection molding machines. These include single mold machines with one or more injection units (the injection unit heats the plastic and forces it into the mold) and two mold machines with two or more injection units. The single mold machines would typically include stack and cube molds with or without additional movement for subsequent plastic injection or assembly. Stack molds comprise two or more generally linear levels of mold cavities that are fed by a single injection unit for each type or color of plastic entering the mold. Cube molds comprise stationary and moving mold cavities in which a portion of the mold rotates to save cycle time, accept another plastic material, assembly, or ejection and are fed by one or more injection units.

Two-mold machines have two or more injection units in opposition. The "B" side of each mold is attached to an ejector system. The center ejector system, or "tombstone", supports the clamp pressure of both molds and provides a method of ejecting parts from both molds. In a two-mold machine the molds could be the same or different. The stack height of each mold could be the same or different.

In all the various types on injection molding machines, there is a premium on the space and weight of the various machine components. There is also a premium on the downtime experienced in switching out various injection mold components. The standard method of securing injection mold components is to install them in the mold (both prior to installing the mold or after the mold is installed on the machine) and then securing them into the machine with screws or bolts. Using the standard method requires significant clearance or space for manual installation, removal, and replacement of various injection mold components.

What is presented is an improved system and method for installation, removal, and replacement of injection mold components to an injection molding machine. The system and method disclosed herein allows for the blind installation of injection mold components, which means that if the operator knows where on the mold the injection mold component needs to be installed, the operator does not have to remove the mold from the injection molding machine. This saves significant effort and time on the part of the operator and reduces overall downtime required to change out injection mold components.

FIGS. 1-4 shows one embodiment of the system for blind installation of injection mold components 10 to an injection molding machine disclosed herein. In this embodiment, a retainer plate that is a shuttle plate 12 is mounted to the injection molding machine specifically at the location on the injection molding machine where the injection mold components 10 are to be installed. FIG. 1 shows the shuttle plate 12 in the installation position. There is at least one locking mechanism 14 on the shuttle plate 12. The location and number of locking mechanisms 14 is determined by the application, but generally, the locking mechanisms 14 are located to align with the various components of the injection molding machine where specific injection mold components 10 are required to perform specific functions.

Figure 4:
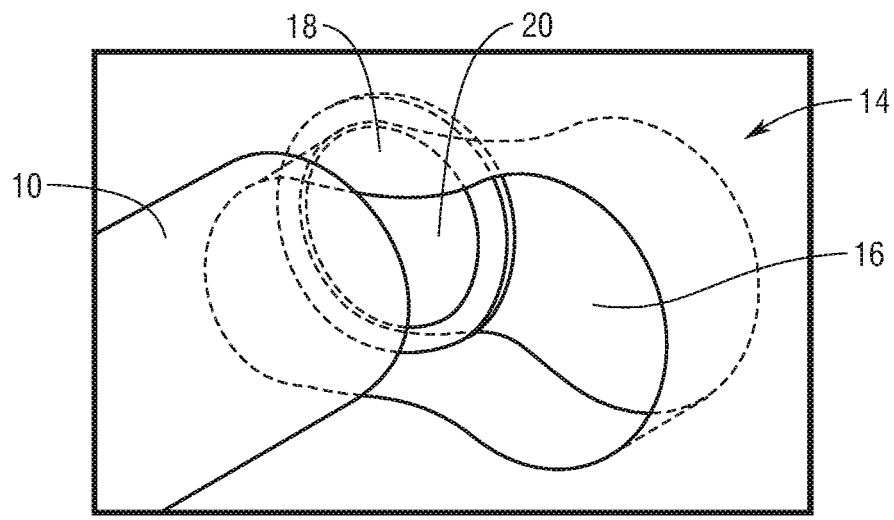
FIG. 4 shows one of the locking mechanisms of FIGS. 1, 2, and 3 with an injection mold component is the lock area and the lock area has a semi-circular edge.

As best seen in FIG. 4, each locking mechanism 14 has a larger installation area 16 and a smaller lock area 18. Each injection mold component 10 has a notch 20 that has a corresponding geometry to the smaller lock area 18. Each said injection mold component 10 is configured to be inserted into the installation area 16 and the shuttle plate 12 is configured to move to seat the notch 20 into the lock area 18 and secure the injection mold component 10 to the shuttle plate 12.

Figure 2:
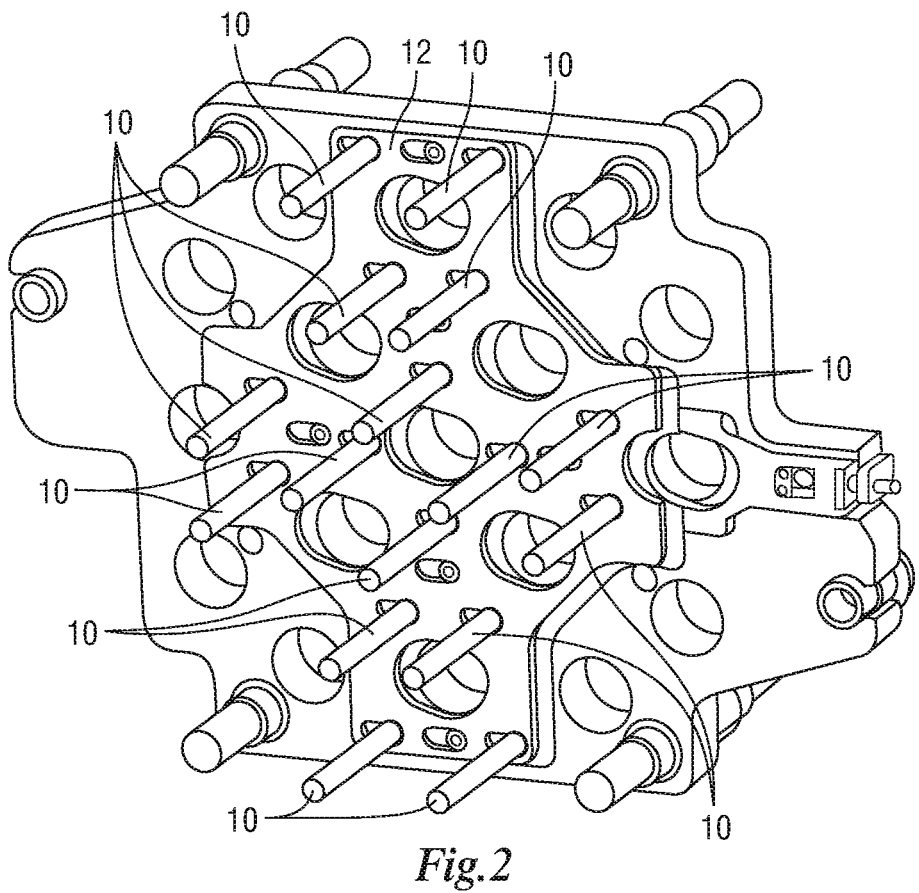
FIG. 2 shows the shuttle plate of FIG. 1 with a plurality of injection mold components inserted into the installation areas of each locking mechanism.
Figure 3:
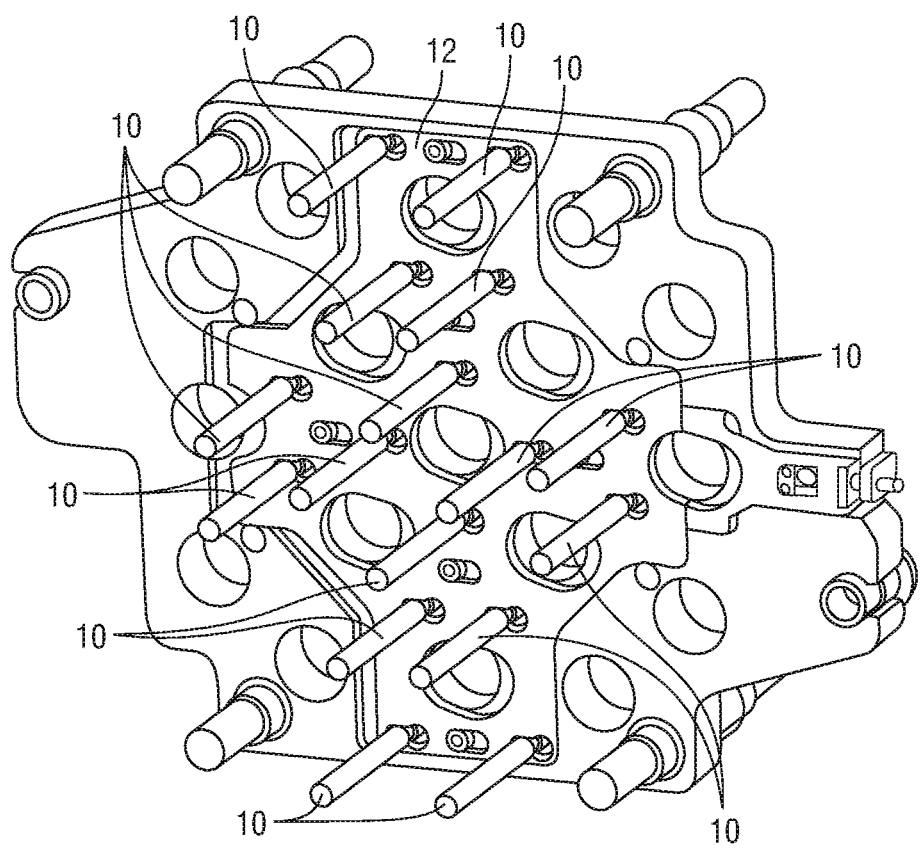
FIG. 3 shows the shuttle plate of FIGS. 1 and 2 with the shuttle plate moved over to lock the injection mold components in the lock area of the locking mechanisms.

Blind installation of injection mold components 10 in an injection is easily achieved using the system disclosed herein. As shown in FIG. 1, the shuttle plate 12 is moved to allow user access to the installation area 16 of the locking mechanism 14. As shown in FIG. 2, the user then inserts the required number and type of injection mold components 10 in the installation area 16 of a corresponding locking mechanism 14 in the shuttle plate 12. As shown in FIGS. 3 and 4, the shuttle plate 12 is moved so that the notch 20 of each injection mold component 10 is seated into the lock area 18 in their corresponding locking mechanism 14 in the shuttle plate 12.

This system can be used for any injection mold component 10 that need to be added, removed, or replaced in an injection molding machine. This includes knockout rods, pins, slides, sleeves, cores, cavities, strippers, ejector pins, and other change components.

Figure 4A:
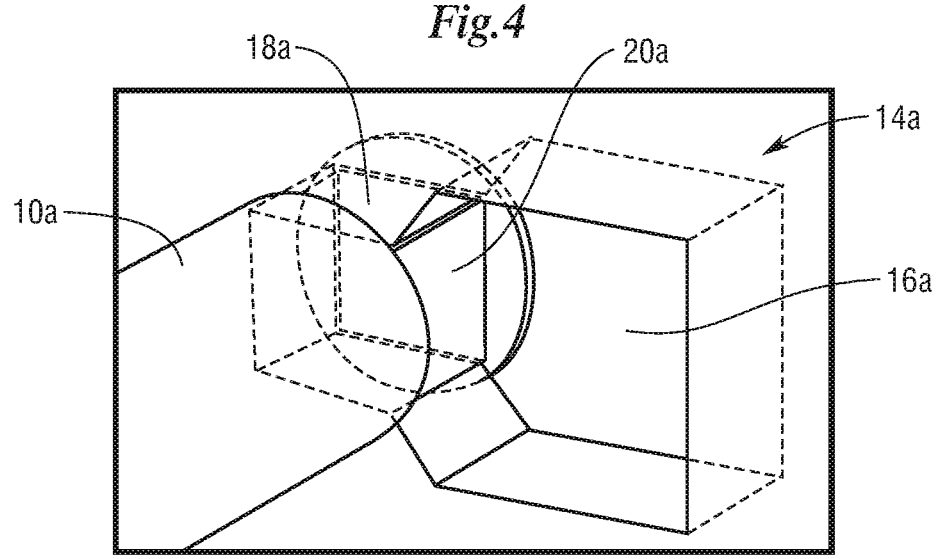
FIG. 4A shows another embodiment of the locking mechanism in which the lock area has a square edge.
Figure 4B:
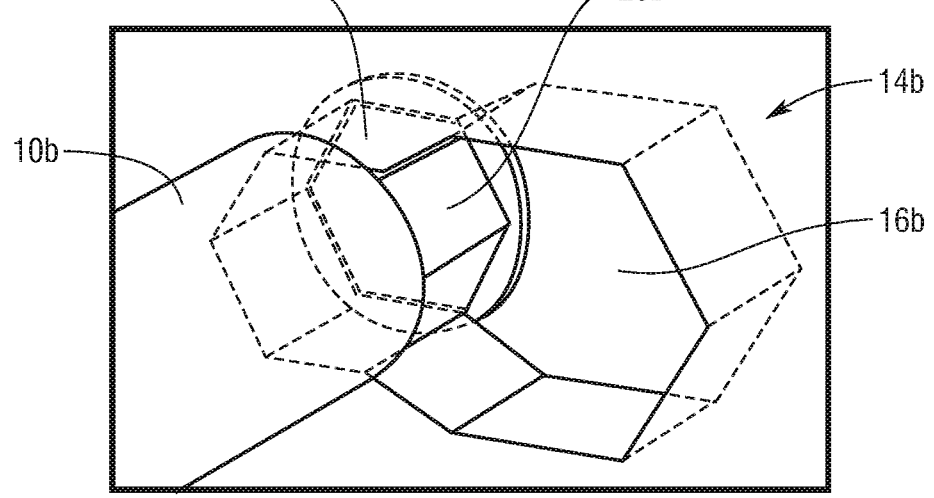
FIG. 4B shows another embodiment of the locking mechanism in which the lock area has a hex edge.

The configuration of the locking mechanism 14 shown in FIGS. 1-4 shows that the lock area 18 as a semi-circular shape. This means that an injection mold component 10 that has notch 20 that has a corresponding geometry 10 to is free to rotate within the shuttle plate 12 unless it is otherwise anchored elsewhere in the injection molding machine. However, it is understood that other configurations of lock areas 18 are possible. FIG. 4A shows an embodiment of locking mechanism 14a has lock area 18a that is a square edge and the notch 20a of the injection mold component 10a has a corresponding square geometry to fit into the lock area 18a. FIG. 4B shows an embodiment of locking mechanism 14b has lock area 18b that is a hex edge and the notch 20b of the injection mold component 10b has a corresponding square geometry to fit into the lock area 18b. In either of the configurations shown in FIG. 4A and FIG. 4B, the respective injection mold components 10a, 10b are not rotatable within their respective lock areas 18a, 18b. The installation areas 18, 18a, 18b in any configuration of locking mechanism 14, 14a, 14b need only be large enough to allow installation of the respective injection mold component 10, 10a, 10b and do not have to have any particular geometry.

Figure 5:
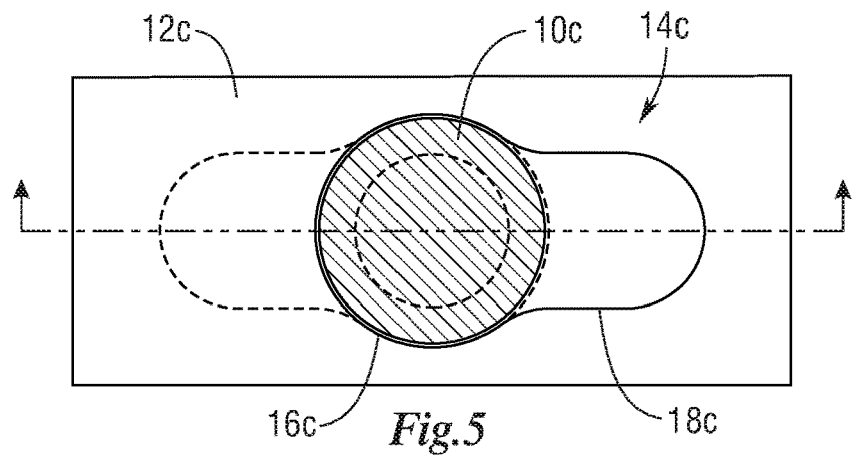
FIG. 5 shows a closeup front view of an embodiment that comprises two overlapping shuttle plates with an injection mold component inserted into the installation area of two overlapping locking mechanisms.
Figure 5A:
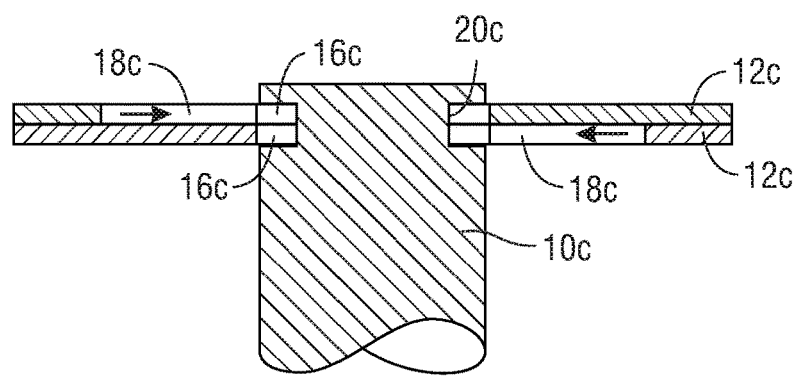
FIG. 5A is a cross sectional view of the two overlapping shuttle plates of FIG. 5.
Figure 5B:
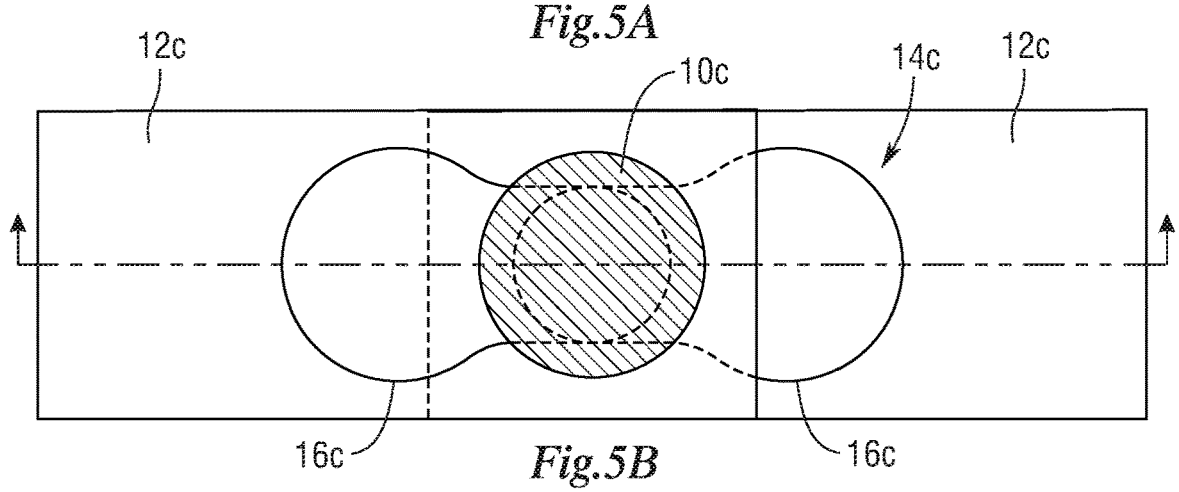
FIG. 5B shows a closeup front view of the two overlapping shuttle plates of FIG. 5 with the shuttle plates moved to secure the injection mold component in the lock area of the two overlapping locking mechanisms.
Figure 5C:
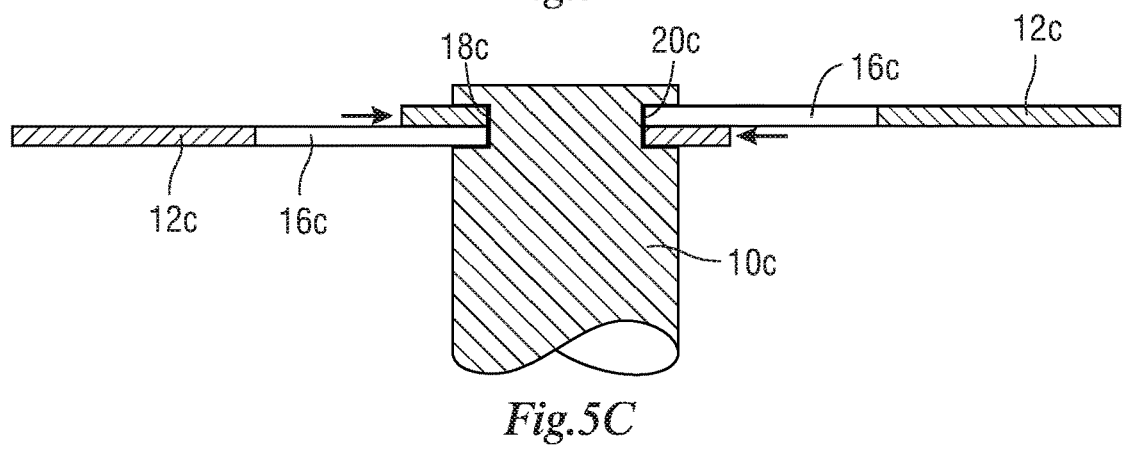
FIG. 5C is a cross sectional view of the two overlapping shuttle plates of FIG. 5B.

Another embodiment of the system for blind installation of injection mold components 10c to an injection molding machine is shown in FIGS. 5-5C. This embodiment is similar to the embodiment disclosed in FIG. 1-4, however in this embodiment, two shuttle plates 12c work in opposition to lock installed injection mold components 10c in place. In this embodiment, two shuttle plates 12c are aligned so that their locking mechanisms 14c overlap. In addition, each locking mechanism 14c is aligned in opposition to each other. FIGS. 5 and 5A show the two shuttle plates 12c in the installation position with an injection mold component 10c inserted into the installation area 16c of the locking mechanism 14c of both shuttle plates 12c. As shown in FIGS. 5B and 5C, locking the injection mold components 10c in place is achieved by moving the two shuttle plates 12c in the directions indicated by the arrows. The notch 20c of the injection mold components 10c have a corresponding geometry to the lock areas 18c of both shuttle plates 12c. Moving the shuttle plates 12c seat the notch 20c of each injection mold component 10c the lock areas 18c of both locking mechanism 14c and provide a more secure installation.

Figure 6:
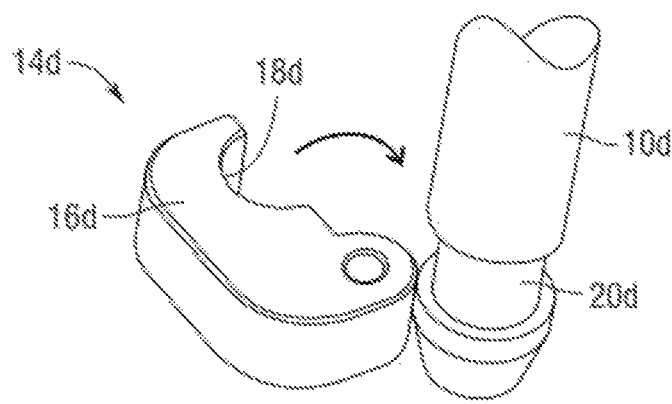
FIG. 6 is a perspective view of an embodiment in which the locking mechanism is a hinge in the open position.
Figure 6A:
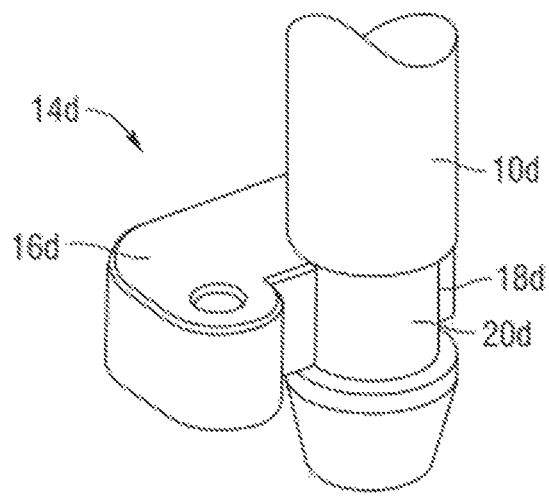
FIG. 6A is a perspective view of the locking mechanism of FIG. 6 in the locked position.

FIGS. 6 and 6A shown another embodiment of the system for blind installation of injection mold components 10d. Similar to the earlier embodiments, in this embodiment, the locking component 14d is a shutter that pivots to move the installation portion 16d and the lock portion 18d into place to secure the injection molding component 10d. However, in this embodiment, the locking components 14d are mounted to a retainer plate (not shown) that allows the actuation of the locking components 14d. Each injection mold component 10d has a notch 20d that has a corresponding geometry to the lock portion 18d of the locking mechanism. Securing the injection mold component 10d is achieved by the user inserting the injection mold component 10d at the required location and actuating the locking mechanism 14d to pivot the lock portion 18d into the notch 20d. The locking components 14d may be actuated mechanically, hydraulically, or pneumatically.

Figure 7:
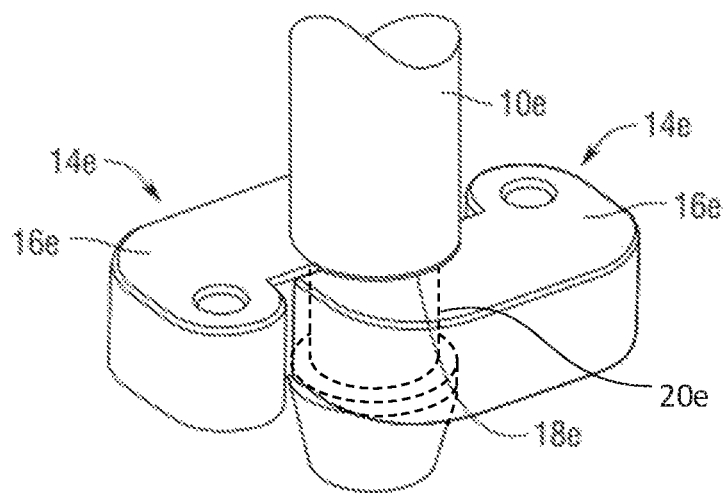
FIG. 7 is a perspective view of an embodiment in which the locking mechanism comprises two hinges in opposition in the locked position.

FIG. 7 shows another embodiment of the system for blind installation of injection mold components 10e comprising two locking components 14e similar to those shown in FIGS. 6 and 6A that to secure the injection mold component 10e. Similar to the earlier embodiments, in this embodiment, the locking components 14e comprises installation portions 16e and a lock portions 18e. In this embodiment, the locking components 14e are also mounted to a retainer plate (not shown) that allows the actuation of the locking components 14e. Each injection mold component 10e has a notch 20e that has a corresponding geometry to the lock portion 18e of the locking mechanism 14e. Securing the injection mold component 10e is achieved by the user inserting the injection mold component 10e at the required location and actuating the locking mechanisms 14e to pivot both lock portions 18e into the notch 20e. The locking components 14e may be actuated mechanically, hydraulically, or pneumatically.

FIGS. 8 and 8A show another embodiment of the system for blind installation of injection mold components 10f comprising a series of locking mechanisms 14f that surround the notch 20f of the injection mold component 10f. In the embodiment shown, four locking mechanisms 14f are located within a retainer plate 12f. Securing the injection mold component 10f is achieved by the user inserting the injection mold component 10f at the required location and actuating the locking mechanisms 14f to move the lock portions 18f into the notch 20f. The locking components 14f may be actuated mechanically, hydraulically, or pneumatically.

FIGS. 9 and 9A show another embodiment of the system for blind installation of injection mold components 10g. Similar to the earlier embodiments, in this embodiment, the locking component 14g is a C-clamp that slides to move the installation portion 16g and a lock portion 18g to secure the injection mold components 10g. As with some of the earlier embodiments, in this embodiment, the locking components 14g are mounted to a retainer plate (not shown) that allows the actuation of the locking components 14g. Each injection mold component 10g has a notch 20g that has a corresponding geometry to the lock portion 18g of the locking mechanism. Securing the injection mold component 10g is achieved by the user inserting the injection mold component 10g at the required location and actuating the locking mechanism 14g to slide the lock portion 18g into the notch 20g. The locking components 14g may be actuated mechanically, hydraulically, or pneumatically.

FIG. 10 shows another embodiment of the system for blind installation of injection mold components 10h comprising two locking components 14h similar to those shown in FIGS. 9 and 9A that to secure the injection mold component 10h. Similar to the earlier embodiments, in this embodiment, the locking components 14h comprises installation portions 16h and a lock portions 18h. In this embodiment, the locking components 14h are also mounted to a retainer plate (not shown) that allows the actuation of the locking components 14h. Each injection mold component 10h has a notch 20h that has a corresponding geometry to the lock portion 18h of the locking mechanism. Securing the injection mold component 10h is achieved by the user inserting the injection mold component 10h at the required location and actuating the locking mechanisms 14h to move both lock portions 18h into the notch 20h. The locking components 14h may be actuated mechanically, hydraulically, or pneumatically.

Figure 11:
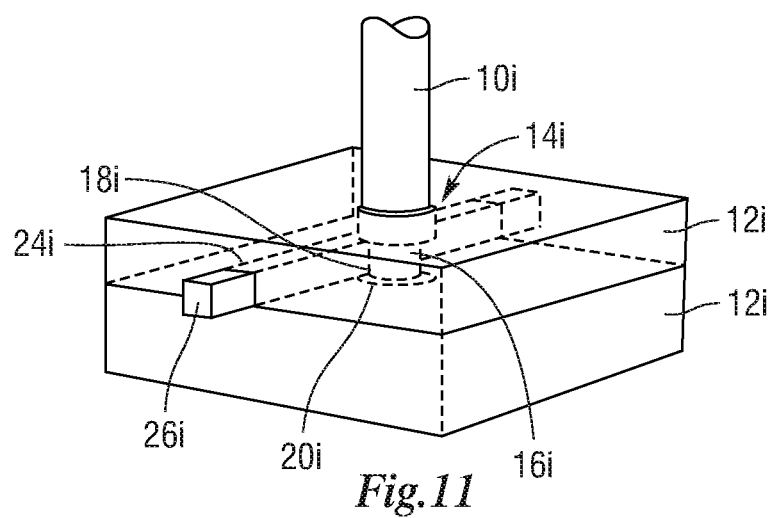
FIG. 11 shows an embodiment of the system in which the locking mechanism comprises a key slot that partially intersects the installation area showing a key inserted into the key slot to lock the injection mold component into the retainer plate.

FIG. 11 shows another embodiment of the system for blind installation of injection mold components 10i. In this embodiment the retainer plate 12i has at least one locking mechanism 14i. The locking mechanism 14i comprises an installation area 16*i* and a lock area 18*i*. The installation area 16*i* is configured to receive an injection mold component 10*i*. The lock area 18*i* comprises at least one key slot 24*i* that runs the length of the retainer plate 12*i* and at least partially intersects the installation area 16*i* of the locking mechanism. A key 26*i* is insertable into the key slot 24*i*. Each injection mold component 10*i* has a notch 20*i* that has a geometry configured such that the insertion of the key 26*i* into the key slot 24*i* intersects the installation area 16*i* and the notch 20*i* to lock the injection mold component 10*i* into the retainer plate 12*i*.

Figure 12:
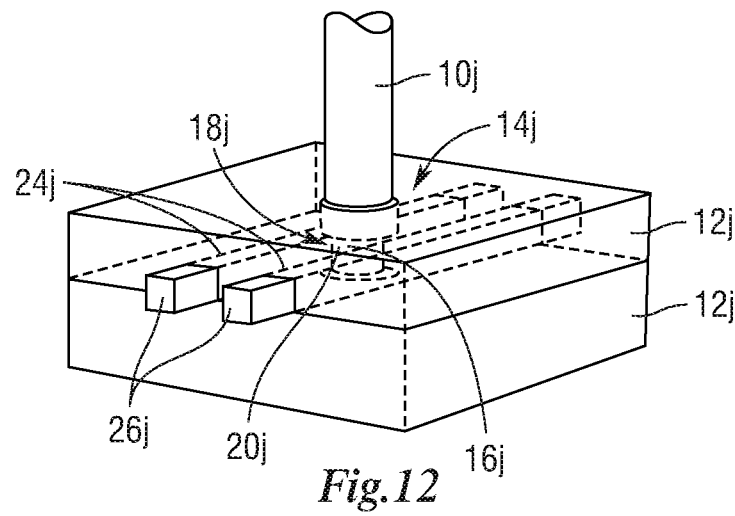
FIG. 12 shows an embodiment of the system in which the locking mechanism comprises two key slots that partially intersect the installation area showing two keys inserted into the key slots to lock the injection mold component into the retainer plate.

FIG. 12 shows another embodiment of the system for blind installation of injection mold components 10*j* that is a variation of the embodiment shown in FIG. 11. In this embodiment, the installation area 16*j* is partially intersected by two key slots 24*j* and up to two keys 26*j* may be used to secure the injection mold component 10*j* into the retainer plate 12*j*.

Figure 13:
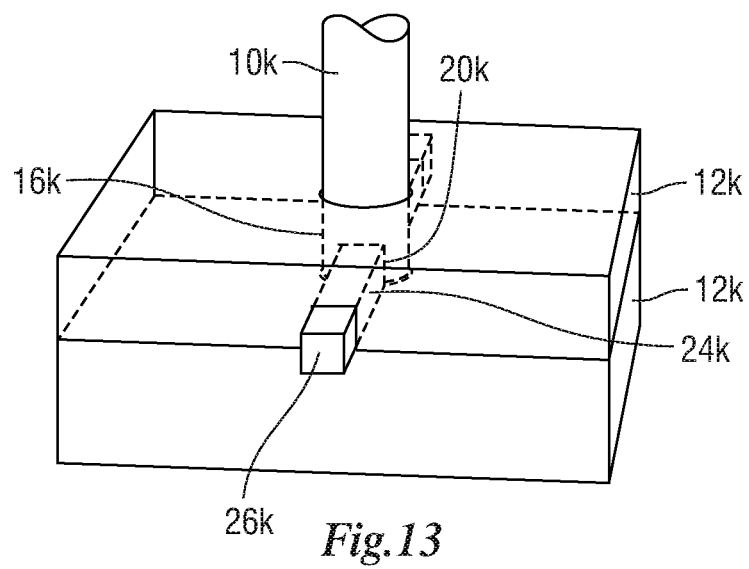
FIG. 13 shows an embodiment of the system in which the locking mechanism comprises a key slot that fully intersects the installation area showing a key inserted into the key slot to lock the injection mold component into the retainer plate.

FIG. 13 shows another embodiment of the system for blind installation of injection mold components 10*k* that is another variation of the embodiment shown in FIG. 11. In this embodiment, the installation area 16*k* is fully intersected by a key slot 24*k*. The notch 20*k* is a hole that aligns with the key slot 24*k*. The injection mold component 10*k* is secured to the retainer plate 12*k* by inserting a key 26*k* inserted into the key slot 24*k* and through the notch 20*k*.

Figure 14:
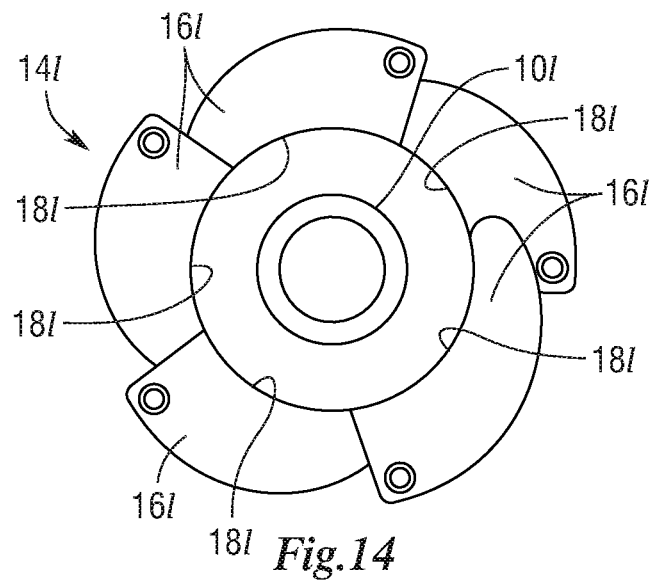
FIG. 14 shows a top view of an embodiment in which the locking mechanism is an aperture in the open position.
Figure 14A:
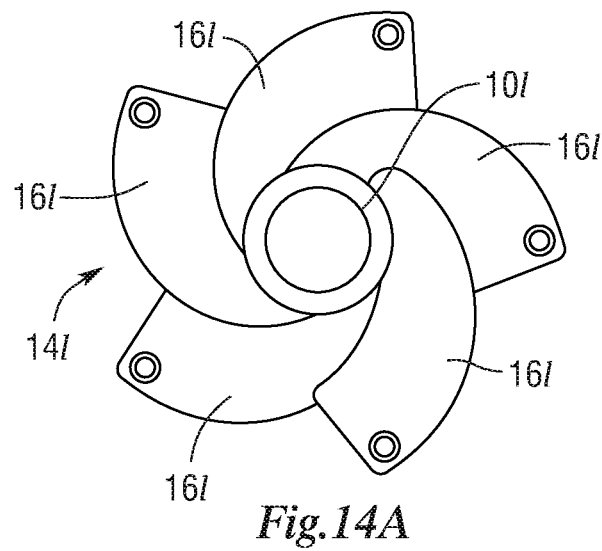
FIG. 14A is a top view of the locking mechanism of FIG. 14 in the locked position.
Figure 14B:
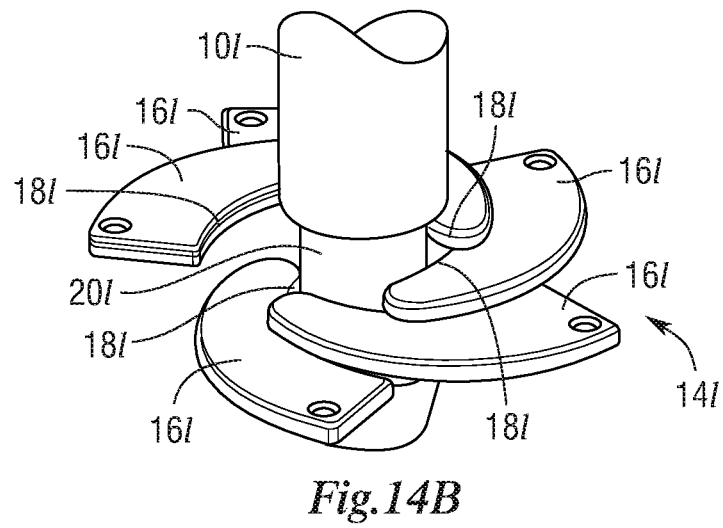
FIG. 14B is a perspective view of the locking mechanism of FIG. 14A.

FIGS. 14, 14A, and 14B shown another embodiment of the system for blind installation of injection mold components 10*l*. In this embodiment, the locking component 14*l* is an aperture that telescopes to move the lock portion 18*l* into place to secure the injection molding component 10*l*. In this embodiment, the locking components 14*l* are mounted to a retainer plate (not shown) that allows the actuation of the locking components 14*l*. Each injection mold component 10*l* has a notch 20*l* that has a corresponding geometry to the lock portion 18*l* of the locking mechanism 14*l*. Securing the injection mold component 10*l* is achieved by the user inserting the injection mold component 10*l* at the required location and actuating the locking mechanism 14*l* to telescope the lock portion 18*l* into the notch 20*l*.

This invention has been described with reference to several preferred embodiments. Many modifications and alterations occur to others upon reading and understanding the preceding specification. It is intended that the invention be construed as including all such alterations and modifications in so far as they come within the scope of the appended claims or the equivalents of these claims.

The invention claimed is:

1. A system for blind installation of parts to an injection molding machine, the system comprising:
    a shuttle plate defining at least one locking mechanism, wherein each said locking mechanism has an installation area and a lock area, and each said installation area is larger than each said lock area; and
    an injection mold component defining a notch that has a corresponding geometry to said lock area such that said injection mold component is configured to be inserted into said installation area and said shuttle plate is configured to move to seat said notch into said lock area and secure said injection mold component to said shuttle plate, wherein said injection mold component is one of a knockout rod, a slide, a sleeve, a stripper, a core, a cavity, an ejector pin, or a change component.

2. A system for blind installation of parts to an injection molding machine, the system comprising:
    a shuttle plate defining at least one locking mechanism, wherein each said locking mechanism has an installation area and a lock area, each said installation area is larger than each said lock area, and each said lock area has a square edge or a hex edge; and
    an injection mold component defining a notch that has a corresponding geometry to said lock area such that said injection mold component is configured to be inserted into said installation area and said shuttle plate is configured to move to seat said notch into said lock area and secure said injection mold component to said shuttle plate.

3. The system of claim 1, wherein said shuttle plate comprises two shuttle plates configured to operate in opposition to one another to lock said injection mold component into said lock area.

4. A system for blind installation of parts, the system comprising:
    a retainer plate defining at least one locking mechanism, wherein said locking mechanism has an installation area and a lock area,
    said lock area has at least one key slot that at least partially intersects said installation area;
    a key insertable into each said key slot; and
    an injection mold component receivable into said installation area of the locking mechanism, wherein said injection mold component defines a notch that has a geometry configured such that the insertion of said key into said at least one key slot intersects said installation area and said notch to lock said injection mold component into said retainer plate.

5. The system of claim 4, wherein said installation area is partially intersected by two said key slots.

6. The system of claim 4, wherein
    said installation area is fully intersected by a said at least one key slot, and
    said notch includes a hole defined through the injection mold component.

* * * * *